(12) United States Patent
Nyamwange

(10) Patent No.: US 11,983,719 B2
(45) Date of Patent: May 14, 2024

(54) AUTOMATED TELLER MACHINE ("ATM") WITH FORENSIC CARD READER IDENTIFICATION VALIDATION

(71) Applicant: Bank of America Corporation, Charlotte, NC (US)

(72) Inventor: Elvis Nyamwange, Little Elm, TX (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/125,893

(22) Filed: Mar. 24, 2023

(65) Prior Publication Data
US 2023/0237486 A1 Jul. 27, 2023

Related U.S. Application Data

(62) Division of application No. 17/148,651, filed on Jan. 14, 2021, now Pat. No. 11,640,608.

(51) Int. Cl.
| | |
|---|---|
| *G06Q 20/40* | (2012.01) |
| *G06Q 20/02* | (2012.01) |
| *G06Q 20/10* | (2012.01) |
| *G06Q 20/32* | (2012.01) |
| *G07D 11/14* | (2019.01) |
| *G07D 11/60* | (2019.01) |
| *G07F 19/00* | (2006.01) |

(52) U.S. Cl.
CPC ....... *G06Q 20/40145* (2013.01); *G06Q 20/02* (2013.01); *G06Q 20/1085* (2013.01); *G06Q 20/325* (2013.01); *G07D 11/60* (2019.01); *G07F 19/211* (2013.01); *G07D 11/14* (2019.01); *G07D 2211/00* (2013.01)

(58) Field of Classification Search
None
See application file for complete search history.

(56) References Cited

U.S. PATENT DOCUMENTS

| | | | |
|---|---|---|---|
| 2016/0267461 A1* | 9/2016 | Chang | G06Q 20/3829 |
| 2018/0063125 A1* | 3/2018 | Bryant | H04L 63/0838 |

OTHER PUBLICATIONS

"Advanced Materials Allow for Embedded ID Card Security Features," https://advantidge.com/embedded-id-card-security-features/, Advantidge, Retrieved on Dec. 13, 2023. (Year: 2020).*

* cited by examiner

*Primary Examiner* — Matthew S Gart
*Assistant Examiner* — Amit Patel
(74) *Attorney, Agent, or Firm* — Weiss & Arons LLP

(57) ABSTRACT

An ATM equipped with forensic card reader identification validation is provided. The ATM may include a real ID card slot. The real ID card slot may accept real ID cards. The ATM may include a call communications module. The call communications module may communicate with a third-party network. Upon insertion of a real ID card at the ATM, the ATM may retrieve security details from the real ID card. The ATM may transmit the security details to the third-party network via the call communications module. The third-party network may verify the security details with one or more databases which are accessible by the third-party network. Upon failure to verify the security details, the third-party network may transmit a failed verification response to the ATM.

7 Claims, 9 Drawing Sheets

AUTOMATED TELLER MACHINE ("ATM") WITH FORENSIC CARD READER IDENTIFICATION VALIDATION

CROSS-REFERENCE TO RELATED APPLICATION

This application is a continuation of U.S. patent application Ser. No. 17/148,651 filed on Jan. 14, 2021 and entitled "AUTOMATED TELLER MACHINE ("ATM") WITH FORENSIC CARD READER IDENTIFICATION VALIDATION" which is hereby incorporated by reference herein in its entirety.

FIELD OF TECHNOLOGY

Aspects of the disclosure relate to automated teller machines ("ATMs"). Specifically, this disclosure relates to verification processes executed at ATMs.

BACKGROUND OF THE DISCLOSURE

ATMs are computerized electronic machines configured to perform basic banking functions. ATMs have become more accessible in recent years.

An ATM card is typically required to verify a user at an ATM. The ATM card is usually inserted into a card slot at the ATM. The ATM reads personally identifiable information ("PII") off the ATM card's chip or magnetic stripe.

Upon reading the PII, the ATM typically requests entry of a numerical personal identification number ("PIN"). Upon receipt of the correct PIN from the card holder, the ATM may authenticate the card holder. As such, the card holder is then authorized to perform the basic banking functions available at the ATM.

At times, a card holder may forget the card holder's PIN and/or misplace the ATM card. As such, the card holder may be unable to perform banking functions at the ATM. Therefore, it may be desirable to enable the user to use a different identification card in order to authenticate at the ATM.

In recent times, real identification ("ID") cards have become available. Real ID cards are based on the Real ID Act of 2005. The Real ID Act of 2005 regulates the requirements on ID cards that can be used across the United States of America. The Real ID Act of 2005 requires a real ID card for certain intra-country travel as of October of 2021.

Some components of the Real ID cards include security features. The security features may be separated into three levels of security features. The three levels of security features include overt, covert and forensic security features. The overt security features are visible to the naked eye or can be felt via touch. Such security features include holograms, colored inks and security threads.

The covert security features are visible to trained examiners using readily available tools such as lights and magnifying glasses. Such security features include ultraviolet ("UV") images, hidden text and hidden images.

The forensic security features are visible in laboratory settings. These security features include nanotext, nanoimages, document DNA ("deoxyribonucleic acid") and substrate analysis.

There has been a recent uptick in the number of real ID cards used throughout the United States of America. These real ID cards include the aforementioned security features. It would be desirable to harness the security features of the real ID cards to authenticate card holders in various locations. It would be further desirable to utilize real ID cards to authenticate card holders at ATMs.

SUMMARY OF THE DISCLOSURE

A method for authenticating a user at an ATM using a real ID card is provided. The method may include receiving the real ID card at a real ID card slot included in the ATM. The method may include receiving a transaction request from the user at the ATM. The transaction request may be received at the ATM via an interactive computerized display.

In some embodiments, a biometric identifier may be entered, by a user, into a secure biometric entry field at the ATM. In certain embodiments, the user may enter the biometric identifier in the course of initiating the transaction request.

The method may include reading a plurality of security details from the real ID card at the ATM. The method may include transmitting the security details from the ATM to the third-party network.

The method may include verifying the security details with one or more databases which are accessible by the third-party network. The third-party network may initiate contact with the one or more databases. The biometric identifier may also be verified at the third-party network, or at one of the aforementioned databases.

In some embodiments, verifying the security details with the one or more databases may be based on a security level assigned to the transaction request. The security level may be assigned by the ATM. The security level may be assigned by the third-party network.

The method may include transmitting a verification response from the third-party network to the ATM. The method may include, upon receipt of the verification response at the ATM, transmitting the transaction request to a remote financial institution. The financial institution may be remote from the ATM. The method may include processing the transaction request at the remote financial institution.

The method may include transmitting a notification from the remote financial institution to the ATM. The notification may indicate completion of the processing of the transaction request. The method may include displaying the notification to the user at the ATM.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
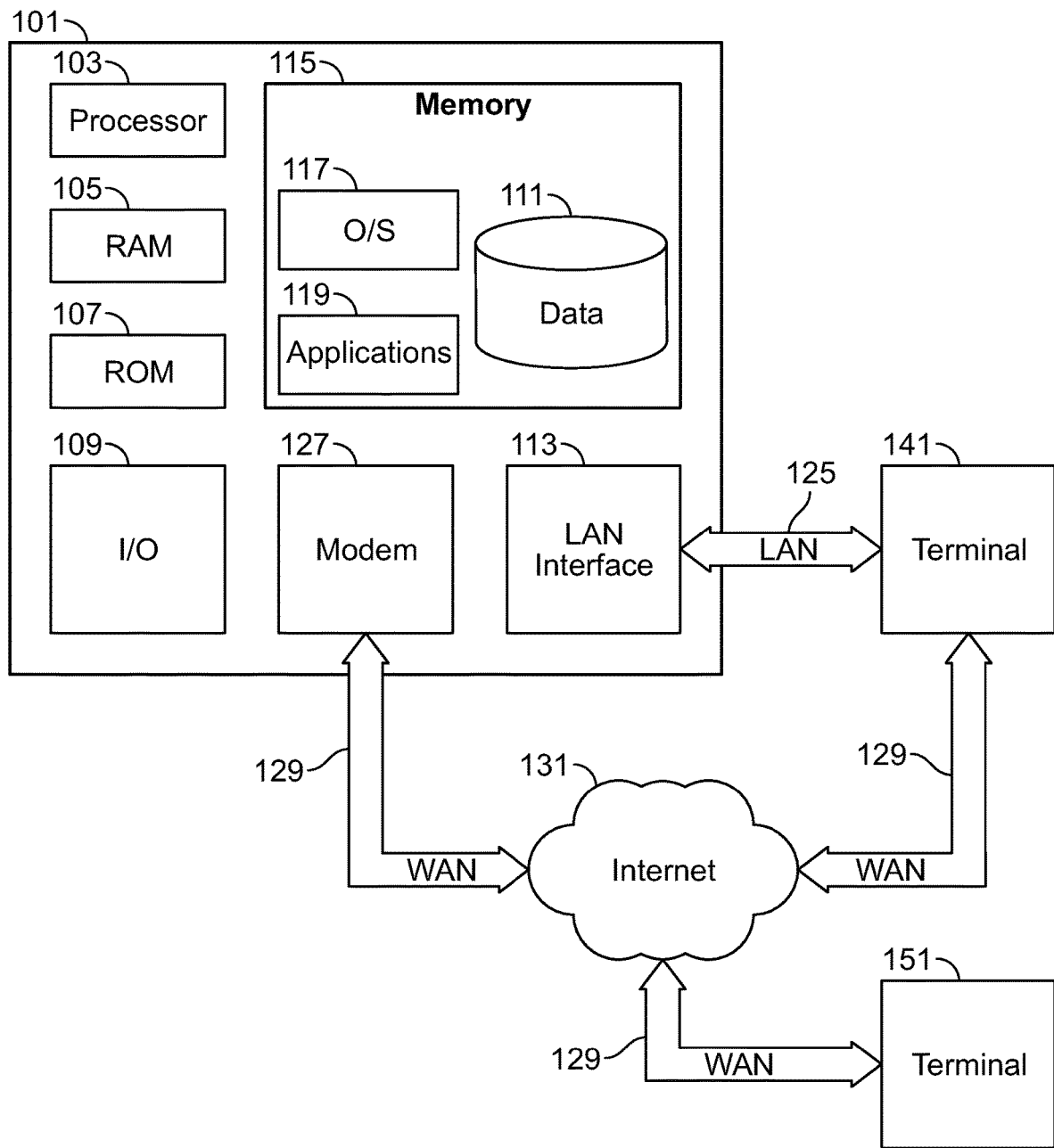
FIG. 1 shows an illustrative diagram in accordance with principles of the disclosure.

An ATM equipped with forensic card reader identification validation is provided. The ATM may include a real ID card slot. The real ID card slot may accept real ID cards.

The ATM may also include a call communications module. The call communications module may communicate with a third-party network. The call communications module may also communicate with a financial institution network.

Upon insertion of a real ID card at the ATM, the ATM may retrieve security details from the real ID card. The ATM may transmit the retrieved security details to the third-party network via the call communications module.

The security details may include name, ID number, address, facial recognition data, fingerprint data, iris data, social security data, birth certificate data and any other suitable security details.

The security details may also include overt security details, also referred to herein as level one security details, covert security details, also referred to herein as level two security details and forensic security details, also referred to herein as level three security details.

Overt security details may include security features that are visible to the naked eye and can be felt via touch. These overt security details may include holograms, colored inks and security threads.

Covert security details may include security features that are visible to trained examiners using basic tools such as lights and magnifying lenses. These covert security details may include UV images. These covert security details may also include hidden items embedded in a document. Such hidden items may include hidden text, hidden images and any other suitable hidden items embedded in a document.

Forensic security details may include security features that are visible in laboratory settings using microscopes and/or other specialized equipment. Forensic security details may include nanotext, nanoimages, document DNA and substrate analysis.

In some embodiments, real ID card security features may be embedded into advanced card material substrate. Examples of card substrates may include Teslin, polyvinyl chloride ("PVC") composite and polyester composite.

Teslin is a paper-like substrate that adds durability to a card. Teslin enables inclusion of secure printing and other security elements. Teslin can be printed with different UV or infrared security elements that are unique to an issuer. These security elements include dots and particles that may give a visible response to infrared or UV light.

In PVC and polyester composite cards, data may be added to the core of the card and then protected with a laminate. Security features, such as holograms, may be added to each layer of the card to enhance card security and/or add complexity to the card.

The third-party network may be operable to verify the security details with one or more databases which are accessible by the third-party. Examples of the databases may include treasury enforcement communications system data repository, advance passenger information data repository, department of homeland security ("DHS") data repository, consular lookup and screening system data repository, transportation security agency data repository. Details of these databases are included in the description of FIGS. 7A, 7B and 7C. For example, the third-party network may verify the name and fingerprint included on the real ID card with one of the aforementioned databases.

Upon verification of these security details, the third-party network may transmit a verification response to the ATM. The verification response may include a verification approval, a failed verification and/or a request for a biometric identifier. A verification approval may authenticate the card holder. A failed verification may fail to authenticate the card holder. A request for a biometric identifier may be a request for additional data, such as a biometric identifier, prior to authentication. Such a biometric identifier request may include a request for a fingerprint scan, iris scan, face scan or any other suitable biometric identifier.

In response to receiving the verification response that includes a request for a biometric identifier, the ATM may request a biometric identifier from the user. Examples of a biometric identifier may be a fingerprint scan, iris scan, face scan or any other suitable biometric identifier. The user may enter the biometric identifier into a biometric entry field included on the ATM. Such a biometric entry field may utilize a camera, touchpad or any other suitable computerized equipment or process. In response to receiving the biometric identifier from the user, the ATM may transmit the biometric identifier to the third-party network for verification.

The third-party network may verify the biometric identifier with the one or more aforementioned databases. The third-party network may transmit a biometric identifier verification to the ATM. The ATM may prompt the user for the transaction request upon receipt of the biometric identifier verification from the third-party network.

In certain embodiments, the biometric identifier may be received at the ATM together with the transaction request. In some embodiments, the biometric identifier may be verified at the ATM prior to transmitting the additional security details to the third-party network. The ATM may block transmission of the security details from the ATM to the third-party network in the event of a failure to authenticate the biometric identifier at the ATM.

In certain embodiments, the ATM may retain the real ID card at the ATM. The ATM may retain the real ID card in the event of a failure to authenticate the biometric identifier at the ATM. The ATM may also retain the real ID card in the event of a failure to authenticate the biometric identifier at the third-party network. The ATM may also retain the real ID card in the event of a failed verification of the real ID card at the third-party network.

In some embodiments, the real ID card and/or biometric identifier may be processed prior to receiving a transaction request. In certain embodiments, the real ID card and/or biometric identifier may be processed concurrently with a transaction request. In embodiments where the transaction request is received and processed after real ID card and/or biometric identifier, the ATM may prompt the user for a transaction request in response to receiving the verification response. The ATM may receive the transaction request from the user.

The call communications module may transmit the transaction request to the financial institution network. The financial institution network may process the transaction request.

The financial institution network may transmit a notification to the ATM. The notification may include an indication of the completion of the processing of the transaction request. The notification may also include details relating to the processed transaction. Upon receipt of the notification at the ATM, the ATM may display the notification on the ATM. The ATM may, prior to displaying the notification, configure the notification in a user-readable manner.

In certain embodiments, the strength of the verification of the security details may be based on a security level assigned to the transaction request. For example, a transaction that includes a cash withdrawal under a predetermined threshold may be assigned a first security level. A transaction that includes a cash withdrawal above the predetermined threshold may be a assigned a second security level. Verification for transactions assigned the first security level may include searching one database. Verification for transactions assigned the first security level may not require a biometric identifier. Transactions assigned a second security level may include searching more than one database. Verification for transactions assigned the second security level may require a biometric identifier.

The real ID card may include a display, a chip, a magnetic stripe, a microprocessor, a memory, one or more of the aforementioned security details and/or any other suitable components and features. The real ID card may have a size that is substantially 85.60 mm×53.98 mm×0.8 mm. The real ID card may be foldable and/or rollable.

The display included in the real ID card may be constructed using organic light emitting diode ("OLED") technology. OLED technology may enhance functionality of a payment instrument. OLEDs are typically solid-state semiconductors constructed from a thin film of organic material. OLEDs emit light when electricity is applied across the thin film of organic material. Because OLEDs are constructed using organic materials, OLEDs may be safely disposed without excessive harm to the environment.

Furthermore, OLEDs may be used to construct a display that consumes less power compared to other display technologies. For example, in a Liquid Crystal Display, power must be supplied to the entire backlight, even to illuminate one pixel in the display. In contrast, an OLED display does not necessarily include a backlight. Furthermore, in an OLED display, preferably, only the illuminated pixel draws power.

The power efficiency of OLED technology presents a possibility for designing nodes that consume less power for their basic functionality and allow any residual power to provide enhanced security and functionality. Illustrative devices that may be constructed using OLED technology are disclosed in commonly assigned U.S. Pat. No. 9,665,818, which is hereby incorporated by reference herein in its entirety.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 is a block diagram that illustrates a generic computing device 101 (alternatively referred to herein as a "server") that may be used according to an illustrative embodiment of the invention. The computer server 101 may have a processor 103 for controlling overall operation of the server and its associated components, including RAM 105, ROM 107, input/output module 109, and memory 125.

Input/output ("I/O") module 109 may include a microphone, keypad, touch screen, and/or stylus through which a user of device 101 may provide input, and may also include one or more of a speaker for providing audio output and a video display device for providing textual, audiovisual and/or graphical output. Software may be stored within memory 125 and/or storage to provide instructions to processor 103 for enabling server 101 to perform various functions. For example, memory 125 may store software used by server 101, such as an operating system 117, application programs 119, and an associated database 121. Alternatively, some or all of server 101 computer executable instructions may be embodied in hardware or firmware (not shown).

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks. When used in a LAN networking environment, computer 101 is connected to LAN 125 through a network interface or adapter 123. When used in a WAN networking environment, server 101 may include a modem 127 or other means for establishing communications over WAN 129, such as Internet 131. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 119, which may be used by server 101, may include computer executable instructions for invoking user functionality related to communication, such as email, short message service (SMS), and voice input and speech recognition applications.

Computing device 101 and/or terminals 141 or 151 may also be mobile terminals including various other components, such as a battery, speaker, and antennas (not shown).

Terminal 151 and/or terminal 141 may be portable devices such as a laptop, cell phone, Blackberry™, or any other suitable device for storing, transmitting and/or transporting relevant information.

Any information described above in connection with database 121, and any other suitable information, may be stored in memory 125.

One or more of applications 119 may include one or more algorithms that may be used to diagnose faults, analyze data sets, parse electronic logs and/or any other suitable tasks related to end-to-end self-service device analysis.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
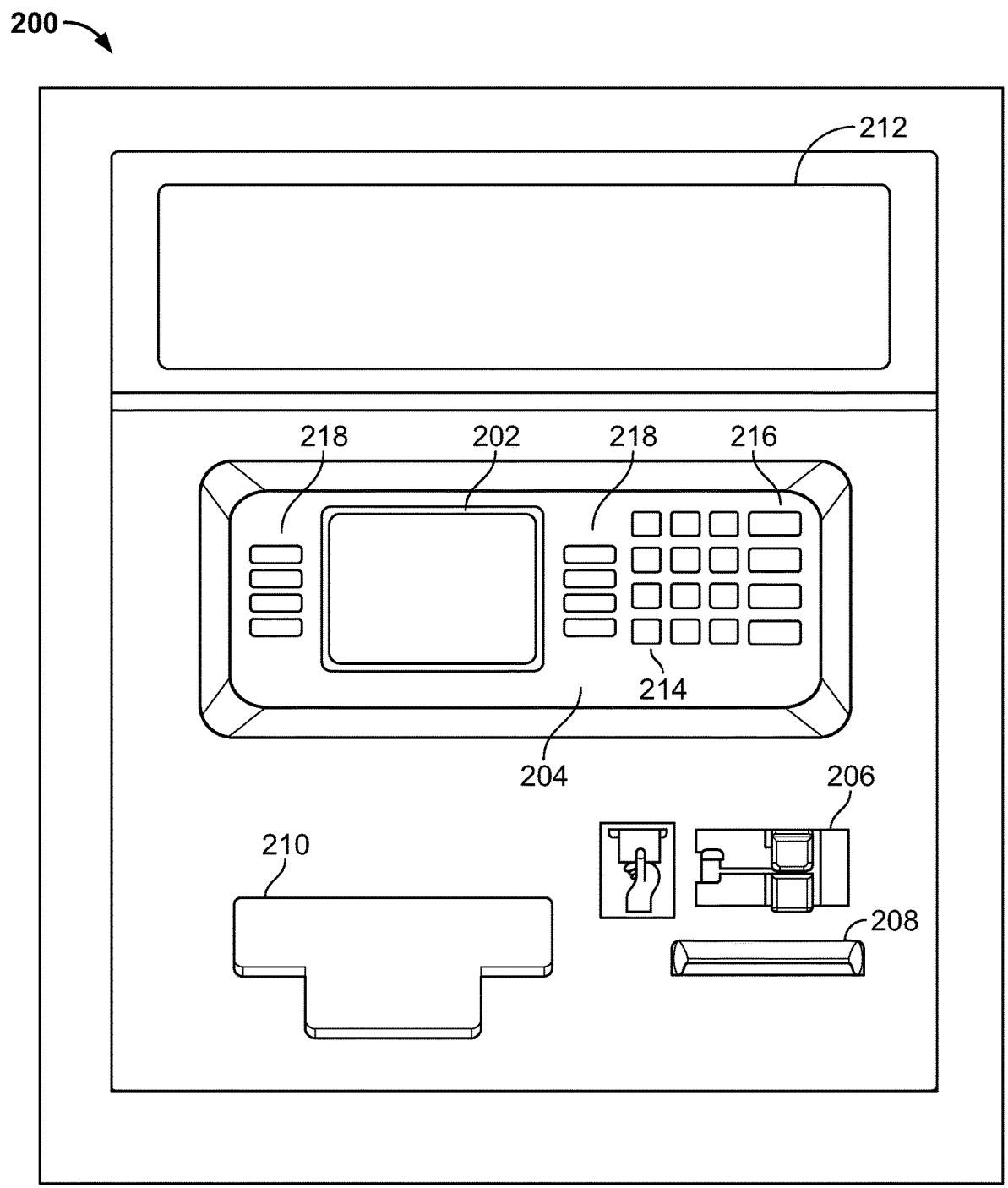
FIG. 2 shows an illustrative diagram in accordance with principles of the disclosure.

FIG. 2 shows illustrative self-service device 200, which may be an ATM. Self-service device 200 may include monitor 202, keypad 204, card reader port 206, document acceptor 208, item dispenser 210 and security screen 212.

Monitor 202 may exchange visual and or audio information with a customer. Keypad 204 may include alphanumeric keys 214 for the customer to enter numerical and textual data. Keypad 204 may include control keys 216. In some embodiments, control keys 216 may be used to communicate control information, such as instructions, to self-service device 200. Keypad 204 may include soft keys. Soft keys 218 may have functions that are dictated by programming and are presented to the customer using information that may be displayed on monitor 202.

Card reader port 206 may be the front end of any suitable card reader. The card reader may read magnetically encoded information on transaction instruments such as bank cards or real ID cards. In some embodiments, self-service device 200 may include a contactless chip reader, a wireless transceiver or any other suitable interface for exchanging transaction information with a transaction instrument. The transaction instrument may be a chip, an RFID tag, a smart card, a PDA, a telephone or any other suitable device.

In some embodiments, self-service device 200 may include a biometric sensor (not shown). The biometric sensor may identify a customer based on a feature, such as an anatomical feature, of the customer. For example, the biometric sensor may be configured to identify the customer based on all or part of a face, a fingerprint, an iris, a retina, a hand or any other suitable anatomical feature. The biometric sensor may identify the customer based on a behavioral feature such as a signature, a voice, a gait or any other suitable behavioral feature.

Document acceptor 208 may accept any suitable documents. For example, document acceptor 208 may accept envelopes, deposit forms, bills, checks or any other suitable documents. In some embodiments, document acceptor 208 may feed into a scanner that digitizes the documents for image-based transaction processing.

Item dispenser 210 may dispense items. For example, item dispenser 210 may dispense bills.

Security screen 212 may visually screen a surveillance device (not shown). The surveillance device may provide video information about individuals that are present near the self-service device and the conditions there.

Figure 3:
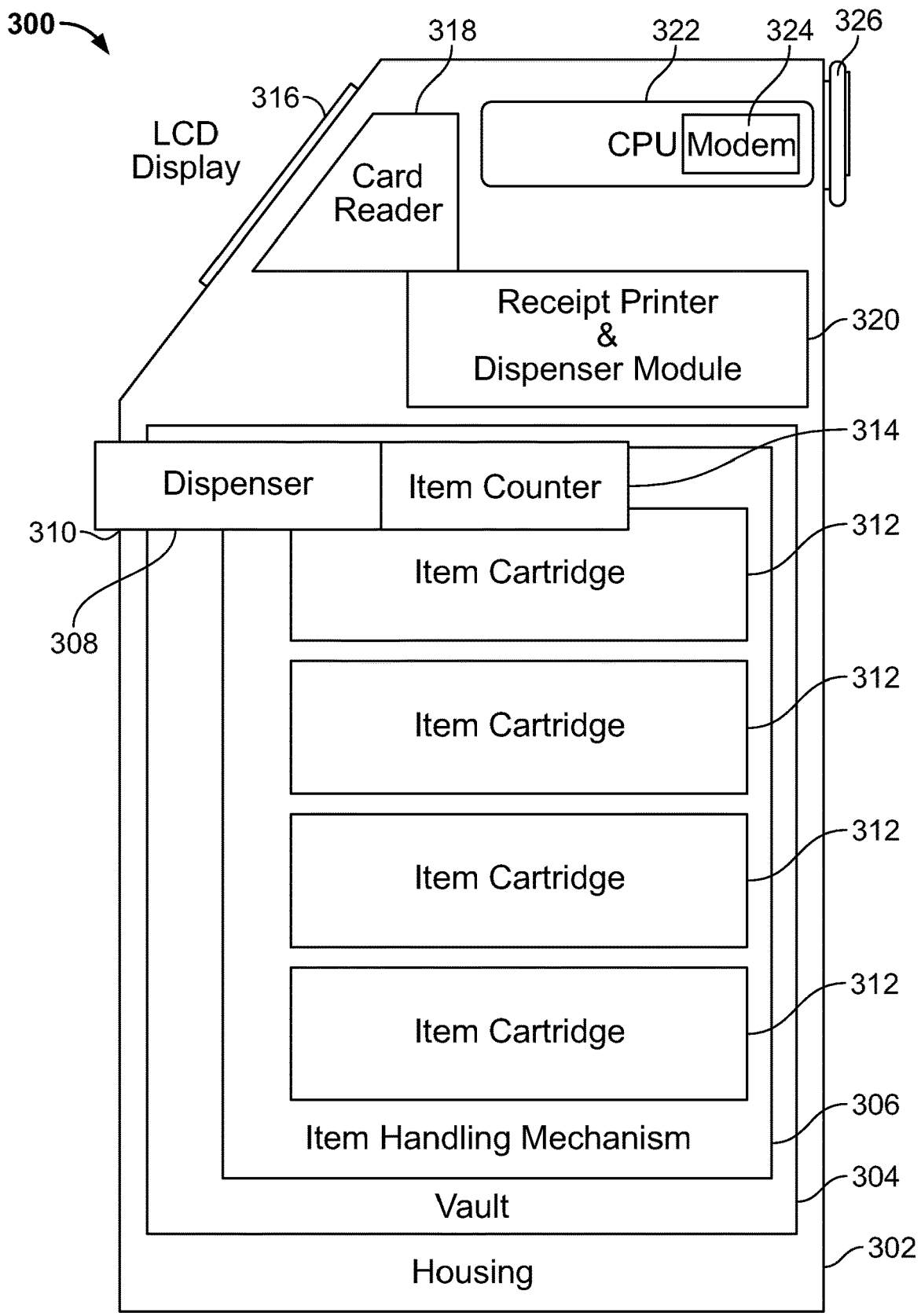
FIG. 3 shows an illustrative diagram in accordance with principles of the disclosure.

FIG. 3 shows illustrative self-service device 300. Self-service device 300 may have one or more of the features of self-service device 200 (shown in FIG. 2). Self-service device 300 may include housing 302. Self-service device 300 may include vault 304. Vault 304 may contain items (not shown). Item handling mechanism 306 may be present in vault 304. Item handling mechanism 306 may store, arrange, dispense and/or otherwise handle items for dispensing from self-service device 200. For example, item handling mechanism 306 may include conveyors (not shown) for positioning and repositioning items for dispensing by dispenser 308 through item port 310. Items (not shown) in item handling mechanism 306 may be contained in item cartridges 312. For example, when the items are bills, item cartridges 312 may be cash cartridges.

Item handling mechanism 306 may include item counter 314. Item counter 314 may count items prior to dispensing by dispenser 308.

Self-service device 300 may include LCD display 316 and a keypad (not shown) for customer interaction. Card reader 318 may be present for receiving transaction information from the customer via a suitable transaction instrument. Self-service device 300 may include receipt printer and dispenser module 320. Receipt printer and dispenser module 320 may provide the customer with a record of a transaction. CPU 320 may control customer I/O, dispensing processes, which may include initialization, actuation, dispensing and any other suitable processes, receipt printing and dispensing, transaction channel communications and any other suitable processes. The transaction channel communications may be performed using modem 324, which may be any suitable communication device. Modem 324 may communicate with a local or regional network router (not shown). Service monitor 326 may be provided for a service technician to exchange information and instructions with CPU 322.

Figure 4:
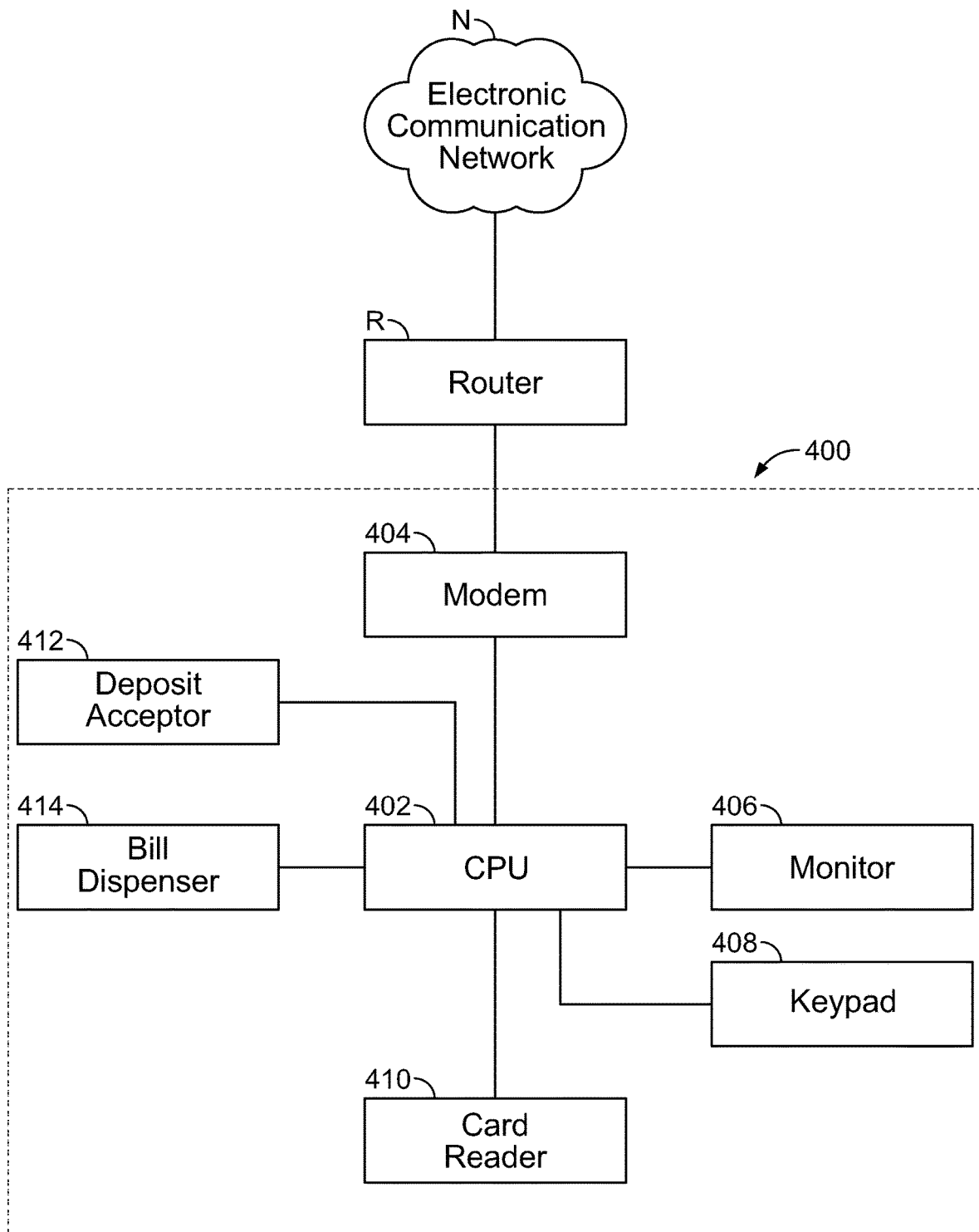
FIG. 4 shows an illustrative diagram in accordance with principles of the disclosure.

FIG. 4 shows control system 400 for controlling a self-service device such as 300 (shown in FIG. 3).

System 400 is controlled by CPU 402. CPU 402 exchanges transaction information with electronic communication network N via modem 404, which is in communication with router R. CPU 402 may receive transaction information from a customer via monitor 406, keypad 408, card reader 410 and deposit acceptor 412. CPU 402 may dispense bills through bill dispenser 414.

Figure 5:
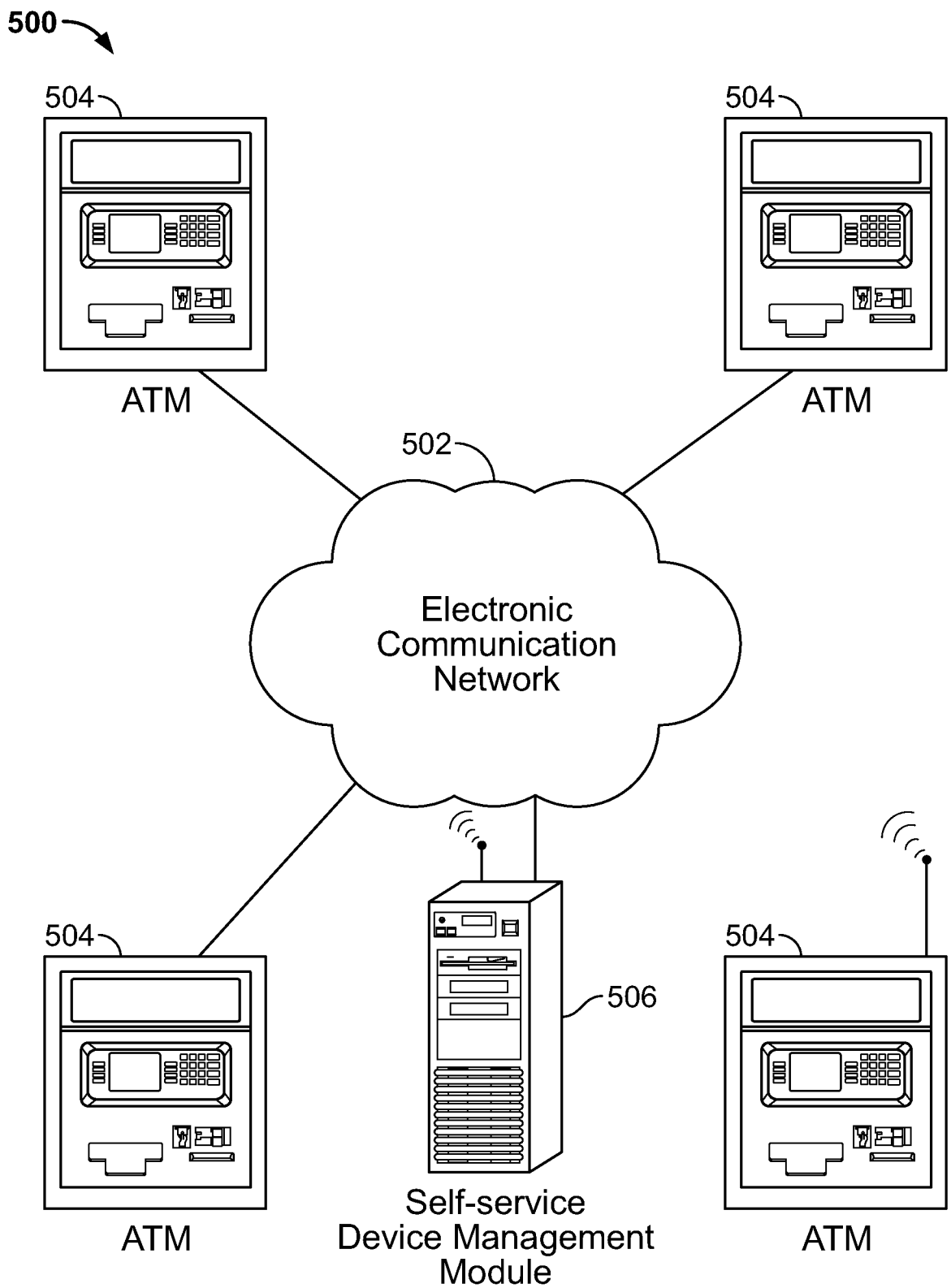
FIG. 5 shows an illustrative diagram in accordance with principles of the disclosure.

FIG. 5 shows illustrative transaction information network 500. Transaction information network 500 may include electronic communication network 502. Network 502 may be in part a LAN or WLAN, a WAN or WLAN or any other suitable network. Network 502 or portions thereof may be cabled, wired, optical fibered or wireless.

Self-service devices such as ATMs 504 may communicate via electronic communication network 502 with self-service device management module 506. Self-service device management module 506 may include one or more devices shown in FIG. 1. A remote user may use self-service device management module 506 to monitor, control, reset, repair and/or intervene in one or more processes of ATMs 504.

Figure 6:
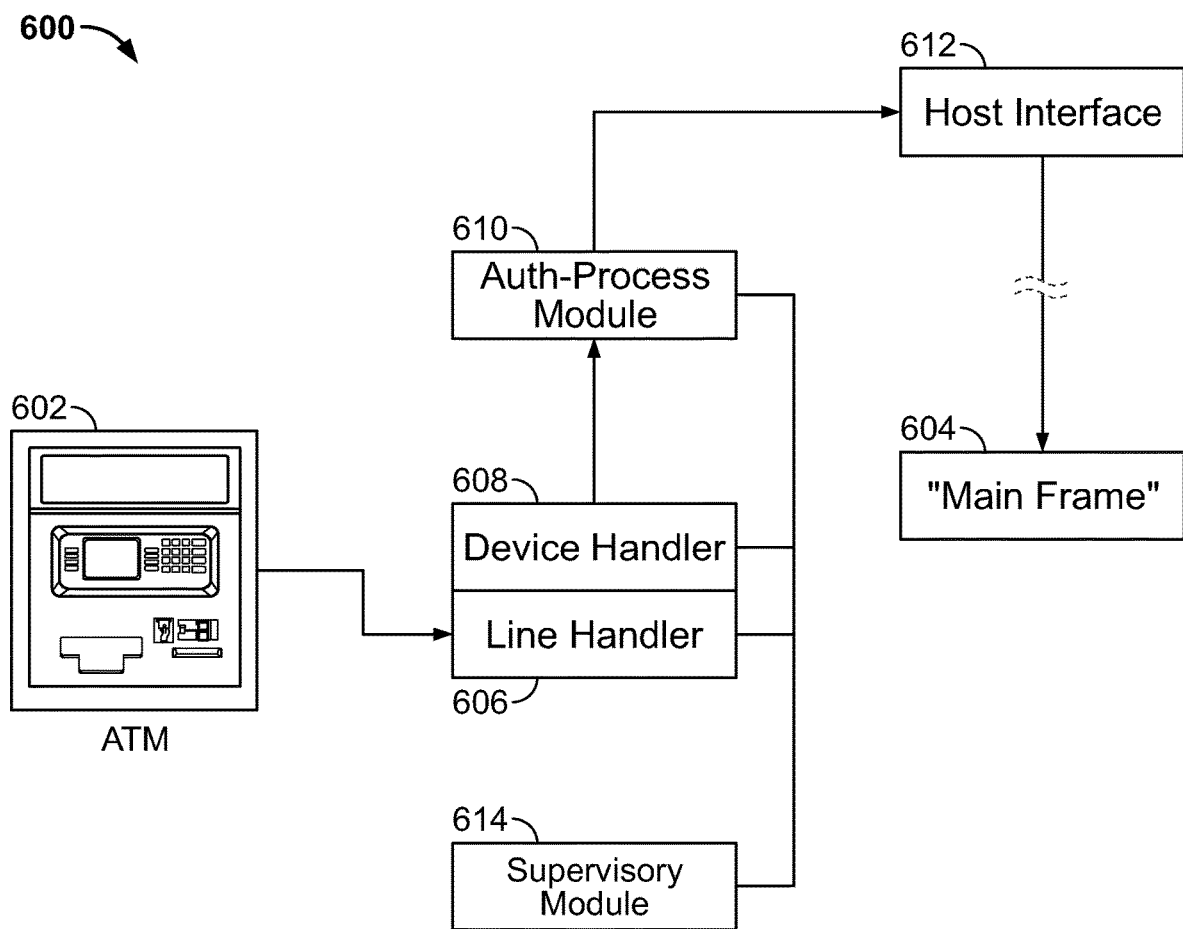
FIG. 6 shows an illustrative diagram in accordance with principles of the disclosure.

FIG. 6 shows illustrative portions of communication system 600 for exchanging transaction information between ATM 602 and financial institution transactional platform 604. ATM 602 may be an ATM such as 300 (shown in FIG. 3). Transactional platform 604 may be any suitable device for settlement and clearing of transactions. For example, platform 604 may be a financial institution mainframe.

Command lines in transactional information from ATM 602 may be executed at line handler protocol layer 606. Device handler 608 may handle routing decisions based on transactional information requirements for authorization, settlement, clearance, transactional networks and issuing financial institutions. Authorization requests may then be processed by auth-process module 610. Auth-process module 610 may then provide transactional information to host interface 612 for communication with platform 604.

Supervisory module 614 may receive diagnostic data from line handler 606, device handler 608, auth-process module 610, or any other suitable source. The diagnostic data may be used to manage ATM 602. The diagnostic data may be provided to a self-service management module such as 406 (shown in FIG. 4).

Figure 7A:
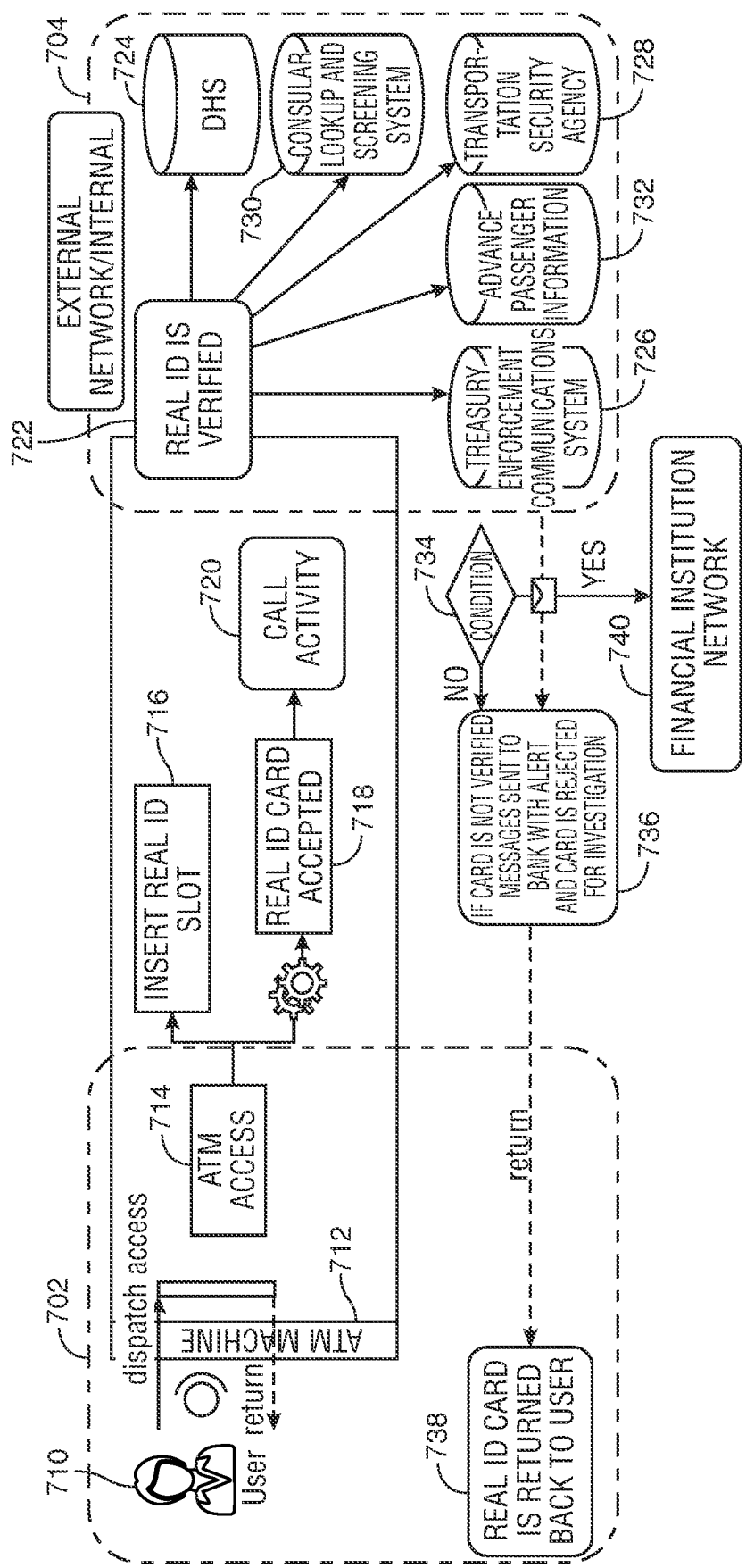
FIGS. 7A, 7B and 7C show an illustrative diagram in accordance with principles of the disclosure.
Figure 7B:
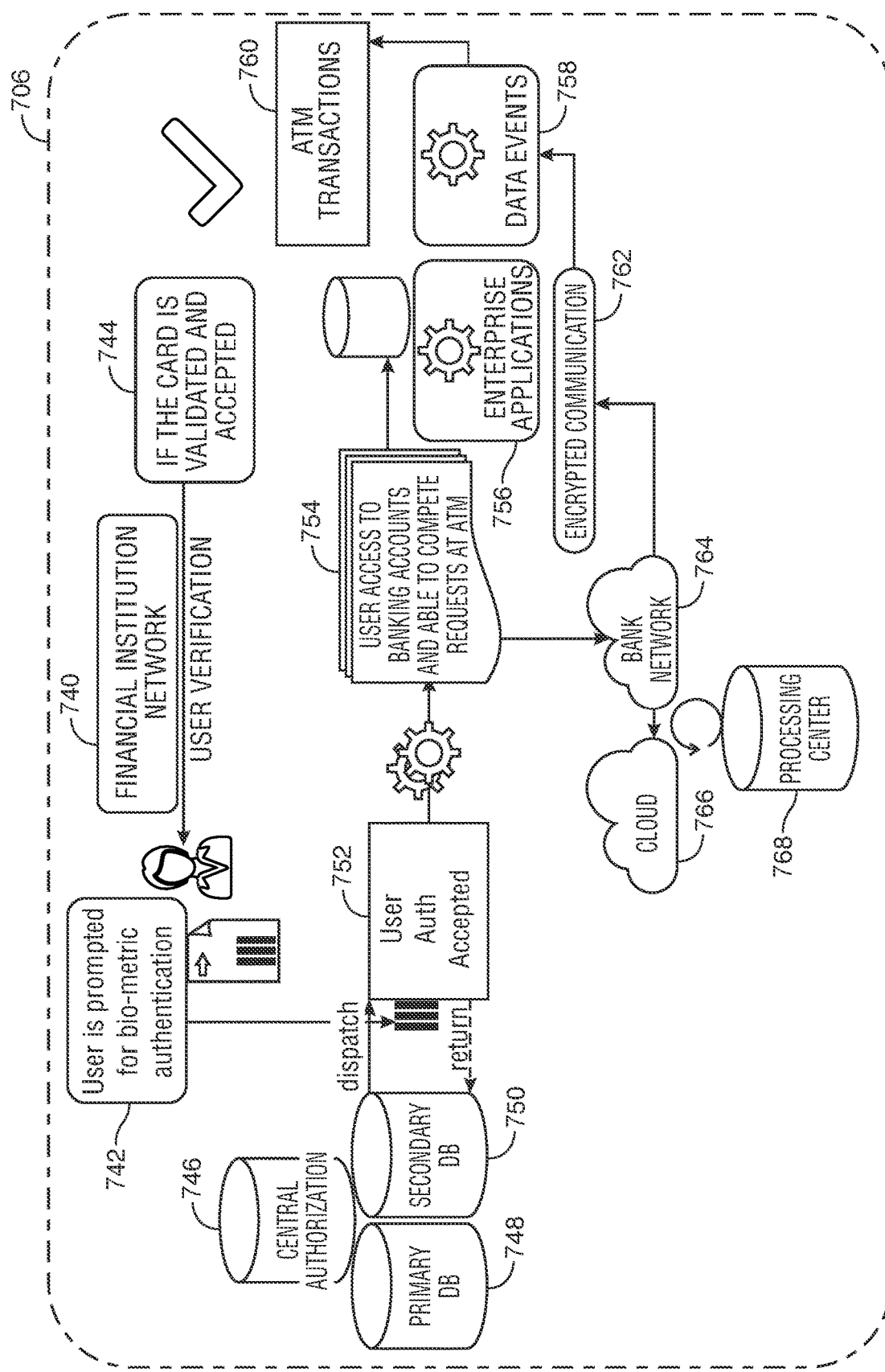
Figure 7C:
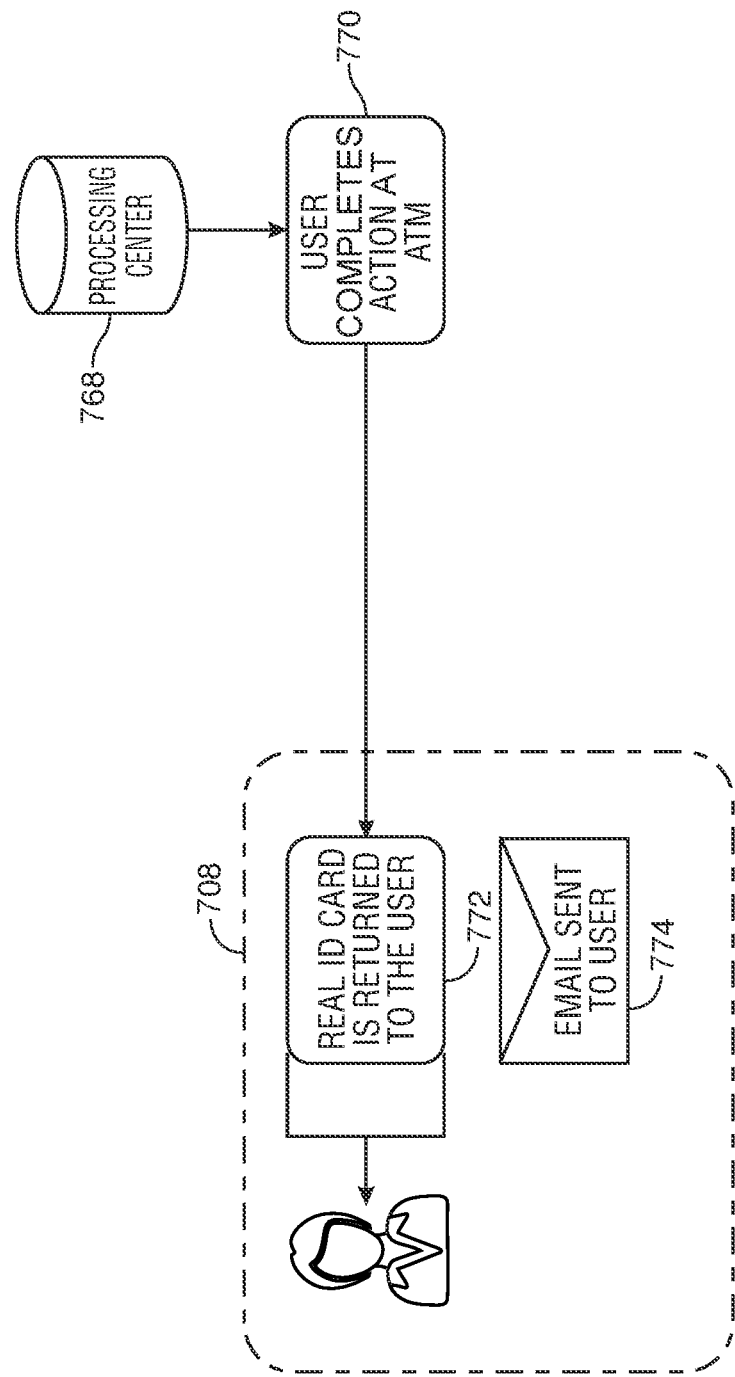

FIGS. 7A, 7B and 7C show an illustrative diagram. FIGS. 7A, 7B and 7C include four sections, section 702 (shown in FIG. 7A), section 704 (shown in FIG. 7A), section 706 (shown in FIG. 7B) and section 708 (shown in FIG. 7C). FIGS. 7A, 7B and 7C also include communications between the sections.

Section 702 may include interaction between a user and an ATM machine.

Section 704 may include communications internal to a network. These communications may occur external to the ATM machine. The communications between section 702 and section 704 may include communications between the ATM machine and the network. These communications may occur external to the ATM machine.

Section 706 may include communications within a financial institution network. These communications may be triggered once a card has been verified at the external network included in section 704.

Section 708 may include conclusion and/or termination of a transaction and/or action initiated at the ATM.

User 710 may approach ATM machine 712 to initiate an ATM-based transaction. User 710 may insert a real ID card into a real ID slot included in ATM 712, as shown at 716. The real ID card may enable the user to access ATM 712, as shown at 714. Once the real ID card has been accepted at the ATM, as shown at 718, the user may begin the ATM-based transaction.

Accepting the real ID card at the ATM may trigger call activity module 720. Call activity module 720 may communicate with networks and/or systems that are external to ATM 712. Call activity module 720 may communicate with verification module 722. Verification module 722 may be located within external network 704. External network 704 may also be external to a financial institution that powers ATM 712. As such, external network 704 may be referred to, herein, as a third-party with respect to both ATM 712 and the financial institution that powers ATM 712.

Verification module 722 may be external to ATM 712. Verification module 722 may verify the real ID card by communicating with an information sharing platform. The information sharing platform may include and/or provide access to one or more data repositories. The information sharing platform may also include and/or provide access to a system of record.

It should be appreciated that the financial institution does not, in preferred embodiments, access the data repositories or the system of record. Rather, the financial institution preferably communicates a query to the third-party. The third-party accesses the data repositories and/or the system of record. The third-party may determine a response to the query based on information retrieved from one or more of the data repositories and/or system of record. The third-party may transmit the determined response to the financial institution, as will be described in greater detail below.

The data repositories may include department of homeland security ("DHS") data repository 724, treasury enforcement communications system data repository 726, transportation security agency data repository 728, consular lookup and screening system data repository 730 and advance passenger information data repository 732.

DHS data repository 724 may include security data. The security data may be used to support law enforcement activities.

Treasury enforcement communications system data repository 726 may include identification data. The identification data may include digital identification information. The digital identification information may identify individuals and businesses suspected of and/or involved in law violations.

Transportation security agency data repository 728 may include travel security data. Data repository 728 may include records of travelers and their respective travels. Data repository 728 may also include biometric data relating to travelers. Data repository 728 may also include screening data relating to travelers.

Consular lookup and screening system data repository 730 may include consular data. Consular data may include passport data, visa data, citizens residing in foreign country data and birth registration data for citizens residing in foreign countries. Data repository 730 may store current and/or archived data from consular domestic and post databases. Data repository 730 may provide a near real-time aggregated data source comprising consular transaction activities occurring at domestic and foreign consular databases.

Advance passenger information data repository 732 may include traveler manifest data. Data repository 732 may be an electronic data interchange system that governs data elements maintained for travel, such as air travel and sea travel. Airlines and sealines may submit manifest data, such as passport details and basic travel information, prior to departure. Such data may be stored in data repository 732.

A response may be transmitted from the external network to the ATM upon the verification of the data included on the real ID card executed at external network 704. The response may vary based on the condition (shown at 734) of whether the real ID card was or was not verified. In the event that the real ID card is not verified, the response may include a "card not verified" message. The "card not verified message" may be sent to the financial institution with an alert and the card may be rejected for investigation, as shown at 736. The real ID card may be returned to the user, as shown at 738. In some embodiments, the card may be retained at the ATM for investigation.

In the event that the card is verified, as shown at 734, the process may proceed from section 704 to section 706. Section 706 may include communications within a financial institution network once a card has been verified at the external network included in section 704.

Financial institution network 740 may authenticate a user. Certain transactions may require a first level of authentication. Certain transactions may require a second level of authentication. Certain transactions may require other levels of authentication. A first level of authentication may include entry of a validated real ID card and entry of a PIN or passcode. A second level of authentication may include entry of a validated real ID card, entry of a PIN or passcode and entry of a biometric identifier. The level of authentication may be based on a required security level associated with the transaction.

Financial institution 740 may provide user verification if the card is validated and accepted, as shown at 744. Such user verification may be utilized in a first level of authentication.

In some embodiments, such as second and/or higher level of authentication, the user may be prompted to enter biometric authentication information, as shown at 742. The biometric authentication information may be retrieved from the user at ATM 712. The user biometric authentication information may be verified at central authorization database 746. Central authorization database 746 may communicate with primary database 748 and secondary database 750. Central authorization database 746 may authenticate the one or more biometric identifiers received from the user.

One or more biometric identifiers may be verified at central authorization database 746, primary database 748 and/or secondary database 750. Upon verification of the biometric identifiers, the user may be authorized, as shown at 752.

Upon user authorization, as shown at 754, the financial institution network may provide the user access to one or more banking accounts. Also, upon user authorization, the financial institution network may provide the user the ability to process transactions and complete requests at ATM 712. ATM transaction requests received from the user may be located within ATM transactions storage 760. ATM transactions storage 760 may communicate with enterprise applications 756 and data events 758 to generate the requested transaction(s). Data events 758 may receive encrypted communications 762 from financial institution network 764. Encrypted communications 762 may be utilized to generate the requested transaction(s). It should be appreciated that financial institution network 764 may be the same as, or different from, financial institution network 740.

Financial institution network 764 may communicate with cloud provider 766 to process the requested transactions. Processing center 768 may complete the processing of the transactions. Processing center 768 may transmit transaction completion information and receipt information to ATM 712. Upon completion of the transaction processing, the process may proceed to section 708, via step 770. At step 770, the user may terminate a session with the ATM. Such a step may involve selecting a selectable option. The selectable option may query the user whether the user has completed all requested tasks at the ATM. When the user selects all requested tasks have been completed at the ATM, the process may proceed to section 708.

Section 708 may include the conclusion and/or termination of a transaction and/or action initiated at the ATM. At the conclusion and/or termination of the transaction and/or action, the real ID card may be returned to the user, as shown at 772. A notification, such as an email, may be sent to the user, as shown at 774. The notification may include transaction details.

Thus, an ATM with forensic card reader identification validation is provided. Persons skilled in the art will appreciate that the present invention can be practiced by other than the described embodiments, which are presented for purposes of illustration rather than of limitation. The present invention is limited only by the claims that follow.

What is claimed is:

1. An automated teller machine ("ATM") equipped with forensic card reader identification validation, the ATM comprising:
   a real identifier card slot, said real identifier card slot operable to accept real identifier cards;
   a call communications module, said call communications module operable to communicate with:
     a third-party network; and
     a financial institution network;
   wherein upon insertion of a real identifier card at the ATM:
     the ATM is operable to assign a security level to a transaction request, said transaction request initiated at the insertion of the real identifier card, at the ATM;
     based on the security level assigned to the transaction request, the ATM is operable to read one or more levels of security details from the real identifier card, the levels of security details comprising:
       a first security detail level, the first security detail level corresponding to a plurality of overt security details, said plurality of overt security details comprising:
         holograms;
         colored ink; and
         security threads;
       a second security detail level, the second security detail level corresponding to a plurality of covert security details, said plurality of covert security details comprising:
         ultraviolet ("UV") images;
         hidden text and
         hidden items; and/or
       a third security detail level, the third security detail level corresponding to a plurality of forensic security details, said forensic security details comprising:
         nanotext;
         nanoimages;
         document DNA ("deoxyribonucleic acid"); and
         substrate analysis;
     the ATM is operable to transmit the security details, included in the one or more levels of security details, to the third-party network via the call communications module;
     the third-party network is operable to verify the security details, included in the one or more levels of security details, with one or more databases which are accessible by the third-party network;
     upon verification of the security details, the third-party network is operable to transmit a verification response to the ATM;
     in response to receiving the verification response, the ATM is operable to:
       prompt a user for a transaction request; and
       receive the transaction request from the user;
     the call communications module is operable to transmit the transaction request to the financial institution network;
     the financial institution network is operable to process the transaction request; and
     the financial institution is operable to transmit a notification to the ATM, said notification comprising completion of processing of the transaction request; and
     upon receipt of the completion of the processing of the transaction request, the ATM is operable to display the notification on the ATM.

2. The ATM of claim 1, wherein the verification response comprises:
   a verification approval;
   a failed verification; and/or
   a request for a biometric identifier.

3. The ATM of claim 2, wherein, when the verification response comprises a request for a biometric identifier, in response to receiving the verification response, the ATM is also operable to request a biometric identifier from the user.

4. The ATM of claim 3, wherein, in response to receipt of the biometric identifier from the user, the ATM transmits the biometric identifier to the third-party network for verification.

5. The ATM of claim 4, wherein the third-party network verifies the biometric identifier with the one or more databases.

6. The ATM of claim 5, wherein the third-party network transmits a biometric identifier verification to the ATM.

7. The ATM of claim 5, wherein, the ATM is operable to prompt the user for the transaction request upon receipt of the biometric identifier verification.

\* \* \* \* \*